(12) United States Patent
Lai

(10) Patent No.: US 12,058,175 B2
(45) Date of Patent: Aug. 6, 2024

(54) METHOD FOR RANSOMWARE STRIKE DETECTION AND DEFENSE, AND RANSOMWARE SECURITY OPERATIONS CENTER (SOC)

(71) Applicant: VX Research Limited, Hong Kong (HK)

(72) Inventor: Cheuk Tung Lai, Hong Kong (CN)

(73) Assignee: VX Research Limited, Hong Kong (HK)

( * ) Notice: Subject to any disclaimer, the term of this patent is extended or adjusted under 35 U.S.C. 154(b) by 41 days.

(21) Appl. No.: 17/739,115

(22) Filed: May 7, 2022

(65) Prior Publication Data
US 2023/0362194 A1  Nov. 9, 2023

(51) Int. Cl.
*H04L 9/40* (2022.01)
(52) U.S. Cl.
CPC ................ *H04L 63/1491* (2013.01)
(58) Field of Classification Search
CPC ................................... H04L 63/1491
See application file for complete search history.

(56) References Cited

U.S. PATENT DOCUMENTS

| | | | | |
|---|---|---|---|---|
| 11,349,855 | B1* | 5/2022 | Amit | G06F 9/547 |
| 2017/0324755 | A1* | 11/2017 | Dekel | G06F 21/60 |
| 2018/0018458 | A1* | 1/2018 | Schmugar | G06F 21/554 |
| 2018/0189488 | A1* | 7/2018 | Arora | G06F 8/71 |
| 2018/0293379 | A1* | 10/2018 | Dahan | G06F 21/568 |
| 2018/0357133 | A1* | 12/2018 | Strogov | G06F 21/80 |
| 2019/0108340 | A1* | 4/2019 | Bedhapudi | G06F 21/554 |
| 2019/0158512 | A1* | 5/2019 | Zhang | H04L 63/145 |
| 2020/0204589 | A1* | 6/2020 | Strogov | H04L 63/1416 |
| 2022/0147622 | A1* | 5/2022 | Chesla | G06F 21/577 |
| 2022/0215096 | A1* | 7/2022 | Spurlock | G06F 11/3058 |

OTHER PUBLICATIONS

M. Zhu, A. H. Anwar, Z. Wan, J. -H. Cho, C. A. Kamhoua and M. P. Singh, "A Survey of Defensive Deception: Approaches Using Game Theory and Machine Learning," in IEEE Communications Surveys & Tutorials, vol. 23, No. 4, pp. 2460-2493, Fourthquarter 2021, doi: 10.1109/COMST.2021.3102874. (Year: 2021).*

* cited by examiner

*Primary Examiner* — Joseph P Hirl
*Assistant Examiner* — Thomas A Gyorfi

(57) ABSTRACT

The application discloses a ransomware security operations center that execute a method for ransomware strike detection and defense. The ransom-SOC leverages honey folders and files, a decoy to detect whether an ongoing ransomware strike is occurring, and local data hiding, a technique that exploits the design flaw of ransomware to enable local data backup subtly, such that ransomware can be detect earlier, the impact of the ransomware infection on the target systems can be reduced, and the critical data survival time for server and workstation can be kept longer during a ransomware strike. The prototype and experiment results suggest that the ransomware security operations center is feasible and can achieve a high data recovery rate on critical files.

18 Claims, 6 Drawing Sheets

METHOD FOR RANSOMWARE STRIKE DETECTION AND DEFENSE, AND RANSOMWARE SECURITY OPERATIONS CENTER (SOC)

TECHNICAL FIELD

The present invention relates to data security, and, in particular embodiments, to a method for ransomware strike detection and defense, and ransomware security operations center.

BACKGROUND

In the recent decade, ransomware strikes are getting more prevalent and severe. Many ransomware campaigns were executed by different cybercriminal groups, causing huge impact to the public. The estimated global economic loss due to ransomware is estimated to be 20 billion USD in 2021 and is predicted to be 265 billion in 2031 (refer to Ransomware Costs Expected to Reach $265 Billion by 2031, https://securityintelligence.com/newskansomware-costs-expected-265-billion-2031/, last accessed 2022/03/15). The largest ransom paid in 2021 was 40 million USD by a US insurance company. The average cost of ransomware, including the ransom and the cost of recovery, is estimated to be 1.85 million USD per victim.

Despite ransomware prevention and detection products such as anti-virus software and end-point security solutions are widely available in the security and defense market, there are still many organizations suffer from ransomware strikes. Most systems and networks do not provide sufficient pre-alert indicators and logs to the administrators to be aware of the ransomware strike.

To defend ransomware strike, Security Operations Center (SOC) is often adopted by organizations to enable monitoring on the network and hosts. However, the typical SOC is not established specifically for ransomware detection, which limits the incident response capability and causes delay in response. The delay could lead to other machines being compromised and attacked by the ransomware.

SUMMARY

In accordance with an embodiment, the method for ransomware defending includes: creating a bait for attracting ransomware; collecting logs of the bait; recognizing an information entropy of the bait, according to the logs of the bait; and activating a backup operation, in response to the change of the information entropy reached the preset change threshold.

Optionally, the backup operation includes: hiding a target file to a plurality of file protectors that are not encrypted by the ransomware.

Optionally, the file protector is file types and/or folders that are not targeted by the ransomware, and the file types and/or folders that are not targeted by ransomware are recorded in a untargeted-object list which is generated by an analyze result of the ransomware. The untargeted-object list can be any suitable data set or data table including several file types and/or folders that are not targeted by ransomware (i.e., not encrypted by the ransomware).

Optionally, the method further includes: updating the untargeted-object list on a regular basis.

Optionally, the backup operation further includes: transferring a target file to remote backup repository.

Optionally, the method further includes: activating the backup operation on a regular basis.

Optionally, the method further includes: activating a defense operation and sending a notice of ransomware strike, in response to the change of the information entropy reached the preset change threshold; wherein the defense operation comprises: resetting password, disabling remote desktop connection, and unmounting and disconnecting all network drives.

Optionally, the bait comprises honeypot host and honey folders and files deployed in system.

In accordance with another embodiment, a ransomware security operations center (SOC) includes: a logs collector configured to collect logs of the bait; a logs analyzer configured to analyze file edition activities of the logs; a comparison configured to monitor whether change of the information entropy is reached the preset change threshold and check whether a blacklisted ransomware file extension appear; and a data backup orchestra center configured to activate a backup operation, in response to the change of the information entropy reached the preset change threshold.

Optionally, the ransomware security operations center further includes: a ransomware sandbox configured to analyze the ransomware; and a file protector definition generator configured to generate a untargeted-object list recording a plurality of file types and/or folders that are not encrypted by the ransomware.

Optionally, the data backup orchestra center is configured to hide a target file to a plurality of file types that are not targeted by the ransomware under different file folders that are not targeted by the ransomware, when the backup operation is activated.

Optionally, the data backup orchestra center is configured to transfer a target file to remote backup repository when the backup operation is activated.

Optionally, the ransomware security operations center further includes: a defense command orchestra center configured to activate a defense operation, in response to the change of the information entropy reached the preset change threshold; and a notification center configured to send a notice of ransomware strike, in response to the change of the information entropy reached the preset change threshold.

Optionally, the bait comprises honeypot host and honey folders and files deployed in system.

Optionally, the data backup orchestra center is configured to activate a backup operation on a regular basis.

In accordance with another embodiment, the electronic device includes: a memory storing computer programs; a processor coupled to the memory; wherein execution of the computer programs by the processor, causes the processor to: creating a bait for attracting ransomware; collecting logs of the bait; recognizing an information entropy of the bait, according to the logs of the bait; activating a backup operation, in response to the change of the information entropy reached the preset change threshold.

Optionally, the backup operation is hiding a target data to a plurality of file protectors that are not encrypted by the ransomware.

Optionally, the file protector is file types and/or folder that are not targeted by the ransomware, and the file types and folders that are not targeted by the ransomware are recorded in a untargeted-object list which is generated by an analyze result of the ransomware.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
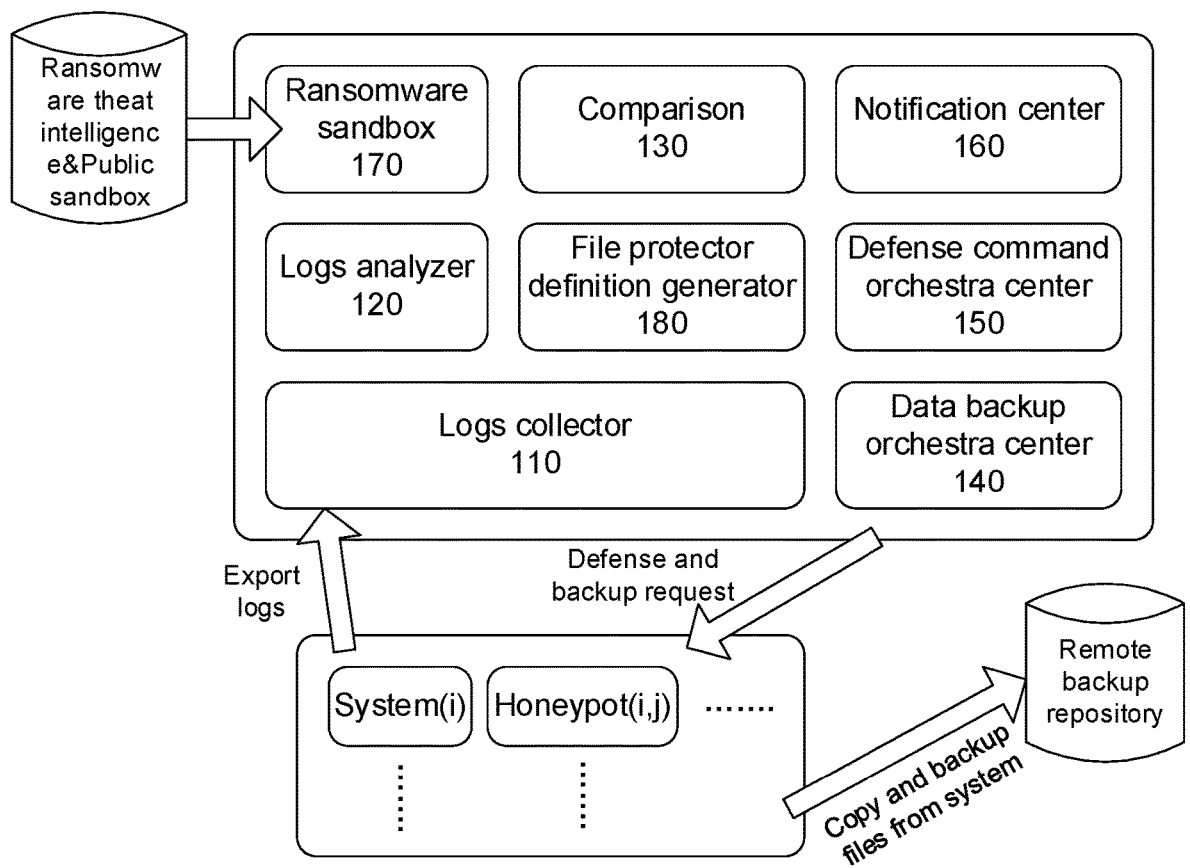
FIG. 1 illustrates a schematic diagram of the ransomware security operations center framework according to the embodiment of the application.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

Based on ransomware incident response and analysis experience from the industry in the past five years, applicant summarize the problem of security design and control in defending ransomware strikes in Table 1.

TABLE 1

| Number | Problem | Description |
|---|---|---|
| 1 | Lack of security vulnerability patch and update | Most organizations have not patched the critical vulnerabilities in their Internet-facing servers including email server, Virtual Private Network (VPN) server, and web server. |
| 2 | Detection bypass by ransomware variants | Attackers can test their ransomware with the published anti-virus detectors and generate various variants to bypass detection. |
| 3 | 3. Lack of Two-Factor Authentication (2FA) | Attackers can access the organization's servers and workstations that have not implemented any 2FA if the credentials are compromised or intercepted in the network. |
| 4 | Lack of ongoing security monitoring | Most organizations have no dedicated team or authority compliance obligation on security monitoring. |
| 5 | Insufficient security monitoring and logs for ransomware detection and data change | The administrative and error logs collected by a Security Operations Center (SOC) is limited to the logs provided by the organization's available detective controls such as operating system events and anti-virus logs. |
| 6 | Lack of immediate defense and response to a ransomware strike | Even if an SOC has identified the ransomware strike is undergoing and the administrators are notified, it could be too late for remedy as other hosts are compromised the data are encrypted already. |
| 7 | Lack of online and offline data backup | Most organizations have not implemented a backup policy to back up their data for both online and offline modes in separate networks. |
| 8 | Improper network segmentation and segregation | The network of a ransomware victim is often a flat network without proper segmentation and segregation. For example, the backup server and Network Access Storage (NAS) are deployed in the same network as a typically shared drive without proper authentication. The data cannot be survived if one of them is vulnerable. |

To overcome the security control deficiency in defending ransomware strike shown in table 1, the application discloses a ransomware security operations center. The ransomware security operations center should have a pipeline to first detect abnormal file activities and encryption by ransomware, followed by backing up the critical data, executing defense instructions to lower the probability of ransomware strikes against other not-yet infected systems, and notifying the administrators as soon as possible once a ransomware strike is detected.

Table 2 compares between a typical SOC and ransomware security operations center conceptually and shows how ransomware security operations center can address the problems listed in Table 1.

TABLE 2

| Action | Typical SOC | Ransomware security operations center |
| --- | --- | --- |
| Data/Logs Source and Collection | Typical system event logs, server logs, access control logs, and threat intelligence only to provide alert and response, without deploying decoy folder and files (known as honey folders and files) for detection as practice. | Specific to ransomware. Hidden decoy folders and files in the server, workstations, and honeypots are deployed strategically according to the system and data criticality. The file/folder change logs are tracked on a continuous basis (Target to overcome problems 4, 5, 8). |
| Detection | Depend on rules to flag the threat in the Security Information and Event Management (SIEM) system. | Separated from SOC. The logs of file/folder modification are gathered, and file content entropy and extension are compared (Target to overcome problems 2, 4, 5). |
| Response | SOC can detect incidents that happen only after encryption or block ransomware. However, if the victim machine is compromised, an attacker can execute whatever they want with administrative privilege. Important files will be eventually encrypted as a result. | If a ransomware strike is detected by ransomware security operations center, logs will be still exported to the SOC. However, ransomware security operations center will notify all shortlisted servers and workstations and automatically execute commands to remedy and request file backup in local and remote storage, which is in a separated network with secure authentication and transfer (Target to overcome problems 1, 3, 6, 7, 8). |

SIEM is referred to: Cinque, M., Cotroneo, D., Pecchia, A.: Challenges and Directions in Security Information and Event Management (SIEM). In: 2018 IEEE International Symposium on Software Reliability Engineering Workshops (ISSREW), pp. 95-99, IEEE (2018). doi: 10.1109/ISSREW.2018.00-24

FIG. 1 illustrates a schematic diagram of the ransomware security operations center framework according to the embodiment of the application. The ransomware security operations center can be deployed in an independent network to detect and defend the ransomware strikes.

The applicant surprisingly finds that the Shannon entropy of document data will change significantly during ransomware strike. Therefore, the ransomware security operations center may detect whether there is a blackmail software strike by creating bait data and monitoring the Shannon entropy of the bait data.

As shown in FIG. 1, in the SOC framework, the modules related to ransomware strike detection mainly include: a logs collector 110, a logs analyzer 120 and a comparison 130.

The logs collector 110 can collect the logs of bait. The bait can be any suitable host, service and documents. In some embodiments, the bait can be honey folders and files and/or honeypot hosts.

For instance, the ransomware security operations center can deploy hidden honey folders and files to attract a ransomware to access each system and honeypot host in the network. Typically, these honey folders and files will be placed hiddenly in the document directory (e.g., My Documents).

The deployment of the honeypot hosts may increase detection capability. The system configuration and software installation of the honeypot host should be close to the production workstation and server to attract the attacker to launch the strike. Meanwhile, the honeypot host can be re stored with a hardware reborn card easily (refer to Recovery (Reborn) Card User's and Reference Manual, http://testere-adaptoare.sorinescu.net/drivere/card-protectie/varianta-A/Recovery %20% 28Reborn%29%20Card.pdf, last accessed 2022/03/15).

The logs analyzer 120 is configured to analyze the file edition activities of the logs, like file modifications and file extension changes. Based on the analysis result, the comparator 130 is configured to monitor whether the change of the information entropy is reached the preset change threshold and check whether a blacklisted ransomware file extension appear. When the change of the information entropy is reached the preset change threshold or the blacklisted ransomware file extension appears, it could be determined that the ransomware strike has occurred.

During practical application, different ransomware may have different behavior in manipulating the honey folders and files. In some embodiments, an experiment by infecting four recent ransomware families is conduced to obtain a useful indicator of compromise.

Figure 2:
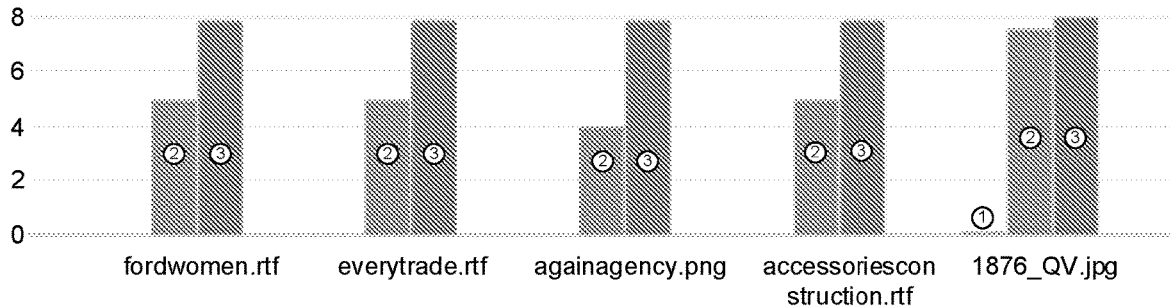
FIG. 2 illustrates a schematic diagram of Shannon entropy before and after ransomware encryption.

The ransomware families with high profile and high impact includes: BlackMatter, Conti, DarkSide, and REvil (refer to Examining Erratic Modem Ransomware Activities: Ransomware in Q3, https://www.trendmicro.com/vinfo/us/security/news/ransomware-by-the-numbers/examini ng-erratic-modern-ransomware-activities-ransomware-in-q3-2021, last accessed 2022 Mar. 15, and Mundo, A., Elias, M.: BlackMatter Ransomware Analysis; The Dark Side Returns, https://www.mcafee.com/blogs/enterprise/mcafee-enterprise-atr/blackmatter-ransomware-analysis-the-dark-side-returns, last accessed 2022 Mar. 15). There are 1,000 randomly crawled files from the Internet with different file types, including CAB, DLL, DOCX, EXE, JPG, GIF, LNK, MP3, MP4, PDF, PNG, PPTX, SYS, TXT, and XSLX, in a sandbox. FIG. 2 is the comparison of the Shannon entropy of the honey files before and after the ransomware infection.

As shown in FIG. 2, the PNG and RTF files with small file size from sample will exhibit a significant change in entropy before and after the ransomware infection. Therefore, these two types of files as honey files can be used to put in the hidden honey folders for ransomware strike detection.

Referring again to FIG. 1, the ransomware security operations center may further include a data backup orchestra center 140, a defense command orchestra center 150 and a notification center 160. The modules described above can perform corresponding protection operations when the ransomware strike appeared, such that the adverse effects caused by the strike can be reduced.

The data backup orchestra center 140 configured to activate a backup operation. The defense command orchestra center 150 configured to activate a defense operation and the notification center 160 configured to send a notice of ransomware strike.

During practical application, whenever the honey files exhibit a significant change in Shannon entropy, the defense command orchestra center 150 may immediately send the defense instructions (e.g., password reset, disabling Remote Desktop Connection, and unmount and disconnect all network drives) to the target servers and workstations. In addition, the data backup orchestra center 140 will request target servers and workstations through to initiate and execute secure copy command to copy all valuable data files to the remote backup server and locally.

In some embodiments, the data backup center can perform data backup operations by transferring the target data to remote backup repositories. The remote backup repository can be any suitable type of device, including but not limited to cloud and delegated servers.

Other than backing up data to remote servers, in some embodiments, a data local backup operation by hiding the critical files into the file types that are not targeted by ransomware is disclosed. As shown in FIG. 1, the modules related to the data local backup operations includes a ransomware sandbox 170 and a file protector definition generator 180.

The data local backup operation exploits a design flaw of ransomware in which system-related files will not be considered for encryption by the ransomware as they are supposed to maintain the functionality of operating system so that a ransom note could be properly displayed.

Based on the analysis of the four ransomware families described as above, it is found that executable (EXE), shortcut (LNK), and library files (DLL, SYS) files are not encrypted by these ransomware families. By hiding the data into these untargeted file types, it may keep the data survival time longer while remote file backup may not be completed when ransomware strikes.

Some ransomware may behave differently and may target on some of these system-related files. Hence, the file protector definition generator 180 is created to accept different ransomware-encryption excluded file types as definition and generate hidden data files as alternate backup.

Specifically, the file protector definition generator 180 can generate a untargeted-object list recording a plurality of file types and/or folders that are not encrypted by the ransomware. Then, the target file can be hided to a plurality of file types that are not targeted by the ransomware under different file folders that are not targeted by the ransomware, through the data backup orchestra center 130.

The naive circumvention techniques including changing the file extension and hiding the document and media files into folders that are not targeted by ransomware (e.g., System 32) have been tested. The test result indicate that some ransomware won't encrypt those files while some still did. Therefore, the following algorithm can be used to enable stealthy local data hiding backup, which is illustrated in Table 3.

TABLE 3

Hiding

For every important file in the folder:
1. Encrypt the file
2. Equally split the file into n partitions
3. Append n splits of the file to the file header that are not targeted by the ransomware.
4. Save to targeted folder that are not targeted by the ransomware as backup TABLE 3-continued Restoration For every protected split file:
1. Remove the file header from the protected file split
2. Combine n splits of file
3. Decrypt and output the restored file The above algorithm is tested by conducting an experiment to run the ransomware against the backup file. These specially crafted backup files are placed in various directories, including User folders (e.g., Desktop, My Documents), C:\, C:\Windows and C:\Program Files, using one of the following file types: DLI, EXE, LNK, SYS. It is found that these backup files could circumvent ransomware encryption. Also, those data can be successfully restored from the ransomware strike.

Figure 3:
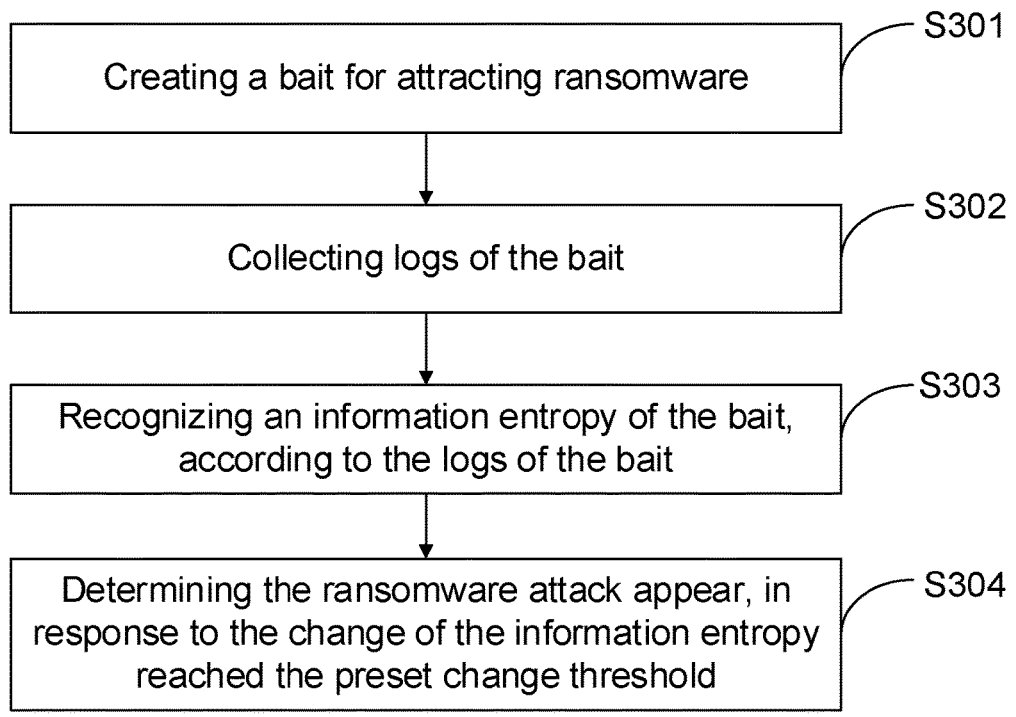
FIG. 3 illustrates flowchart of the method for ransomware attack detection according to the embodiment of the application.

FIG. 3 illustrates a flowchart of the method for ransomware attack detection according to the embodiment of the application. As shown in FIG. 3, the method includes follow steps.

S301: creating a bait for attracting ransomware.

The bait can be suitable honey folders and files that will be placed hiddenly in the document directory. In some embodiments, the bait can further include honeypot host to increase detection capability.

S302: collecting logs of the bait.

Different ransomware may have different behavior in manipulating the honey folders and files. The different behavior can be recorded by the logs of the bait.

S303: recognizing an information entropy of the bait, according to the logs of the bait.

The activities of these honey folders and files, like file modifications and file extension changes, and relative information, such as the information entropy can be recognized by analyzing the logs.

S304: determining the ransomware attack appear, in response to the change of the information entropy reached the preset change threshold.

In some embodiments, entropy-based detection could be combined with other event log analysis to promote the accurate of ransomware detection.

Figure 4:
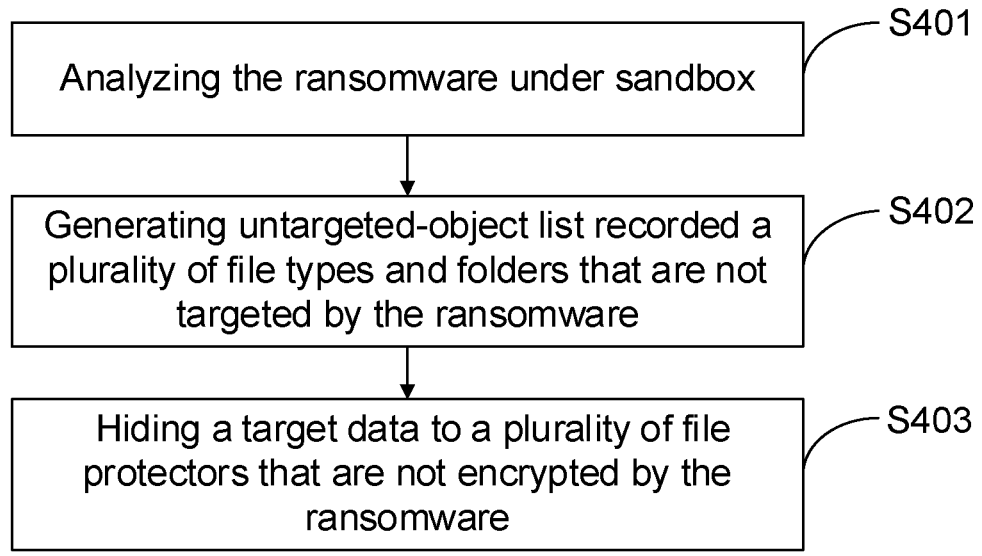
FIG. 4 illustrates a flowchart of the method for data local backup under ransomware attack according to the embodiment of the application.

FIG. 4 illustrates a flowchart of the method for data local backup under ransomware attack according to the embodiment of the application. As shown in FIG. 4, the method includes follow steps.

S401: analyzing the ransomware under sandbox.

The ransomware can be any suitable ransomware sample. The analyze result may provide the intelligence of the ransomware attack.

S402: generating a untargeted-object list recorded a plurality of file types and folders that are not targeted by the ransomware.

The file types and/or folders is the document that are not encrypted by the ransomware. In some embodiments, it can also be called untargeted file types and folders.

S403: hiding a target data to a plurality of file protectors that are not encrypted by the ransomware.

The file protector is file types under folders that are not targeted by the ransomware. The target data can be any suitable data predefined by the user or administrator. The whole target data can be separated into several parts and hid to different file protectors.

There are also other backup solutions to avoid damage from ransomware attack. For example, researcher suggests device-level backup solutions (refer to Min, D., Ko, Y., Walker, R., Lee J., Kim, Y.: A Content-based Ransomware Detection and Backup Solid-State Drive for Ransomware Defense. In: IEER Transactions on Computer-Aided Design of Integrated Circuits and Systems, IEEE (2021). doi: 10.1109TCAD.2021.3099084). Another alternative is to back up data in secure space locally or remotely. ShieldFS (a self-healing, ransomware-aware filesystem, refer to Continella, A., Guagnelli, A., Zingaro, G., De Pasquale, G., Barenghi, A., Zanero, S., Maggi, F.: ShieldFS: a self-healing, ransomware-aware filesystem. In: Proceedings of the 32nd Annual Conference on Computer Security Applications, pp 336-347. ACM, 2016) and RDS3 (Ransomware defense strategy by using stealthily spare space, refer to Subedi, K. P., Budhathoki, D. R., Chen, B., Dasgupta, D.: RDS3: Ransomware defense strategy by using stealthily spare space. In 2017 IEEE Symposium Series on Computational Intelligence (SSCI), pp. 1-8. IEEE, 2017) can support local secure space backup but current system needs to be modified, which will be restricted and reluctant to organizations. For secure remote spaces, solutions such as CLD-Safe (an efficient file backup system in cloud storage against ransomware, refer to Yun, J., Hur, J., Shin, Y., Koo, D.: CLDSafe: an efficient file backup system in cloud storage against ransomware. *IEICE TRANSACTIONS on Information and Systems*, vol. E100-D, pp. 2228-2231, *IEICE* (2017). doi:10.1587/transinf.2017EDL8052) can be engaged with external resources. Compared with backup solutions described above, the data local backup operation by hiding to the file protector offers a much simpler way for data backup, which has a high recovery rate even under ransomware attack and without regular backup.

Figure 5:
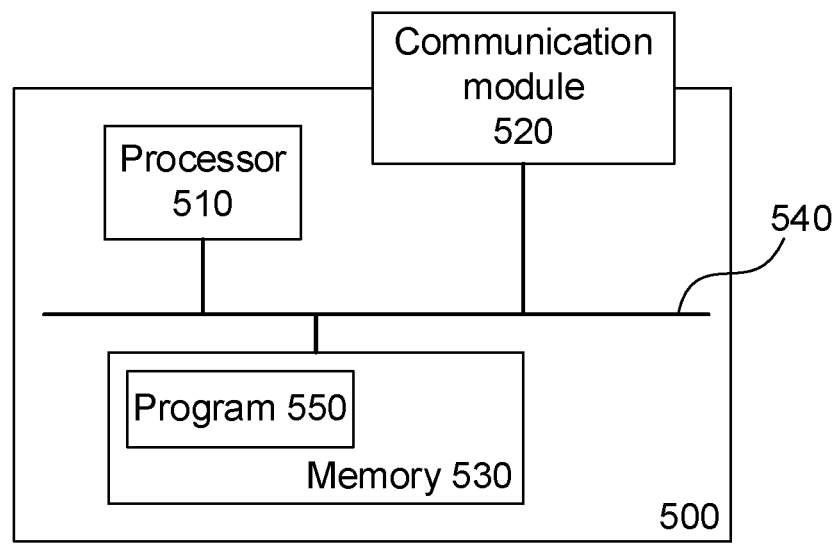
FIG. 5 illustrates a structural diagram of an electronic device according to an embodiment of the application.

As shown in FIG. 5 which is a structural diagram of an electronic device according to an embodiment of the application. The electronic device can be any type of intelligent terminal, and its specific implementation is not limited here.

The electronic device 500 may include a processor 510, a communication module 520, a memory 530 and a bus 540.

The processor 510, the communication module 520 and the memory 530 communicate with each other through the bus 540. The communication module 520 is used for communication connection with other devices. The processor 510 is used to invoke the program 550 to execute one or more steps in the method for ransomware attack detection and the method for data local backup under ransomware attack in the above embodiment. Specifically, the program 550 may include program code or computer operation instructions.

In this embodiment, according to the type of hardware used, the processor 510 may be a central processing unit, other general-purpose processors, digital signal processors, application specific integrated circuits, off the shelf programmable gate arrays or other programmable logic devices, discrete gate or transistor logic devices, discrete hardware components, etc.

The memory 530 is used to store the program 550. The memory 530 may include high-speed RAM memory or nonvolatile memory, such as at least one disk, memory CD-ROM, optical memory, etc.

Embodiment 1: Proof of the Ransomware Security Operations Center

Figure 6:
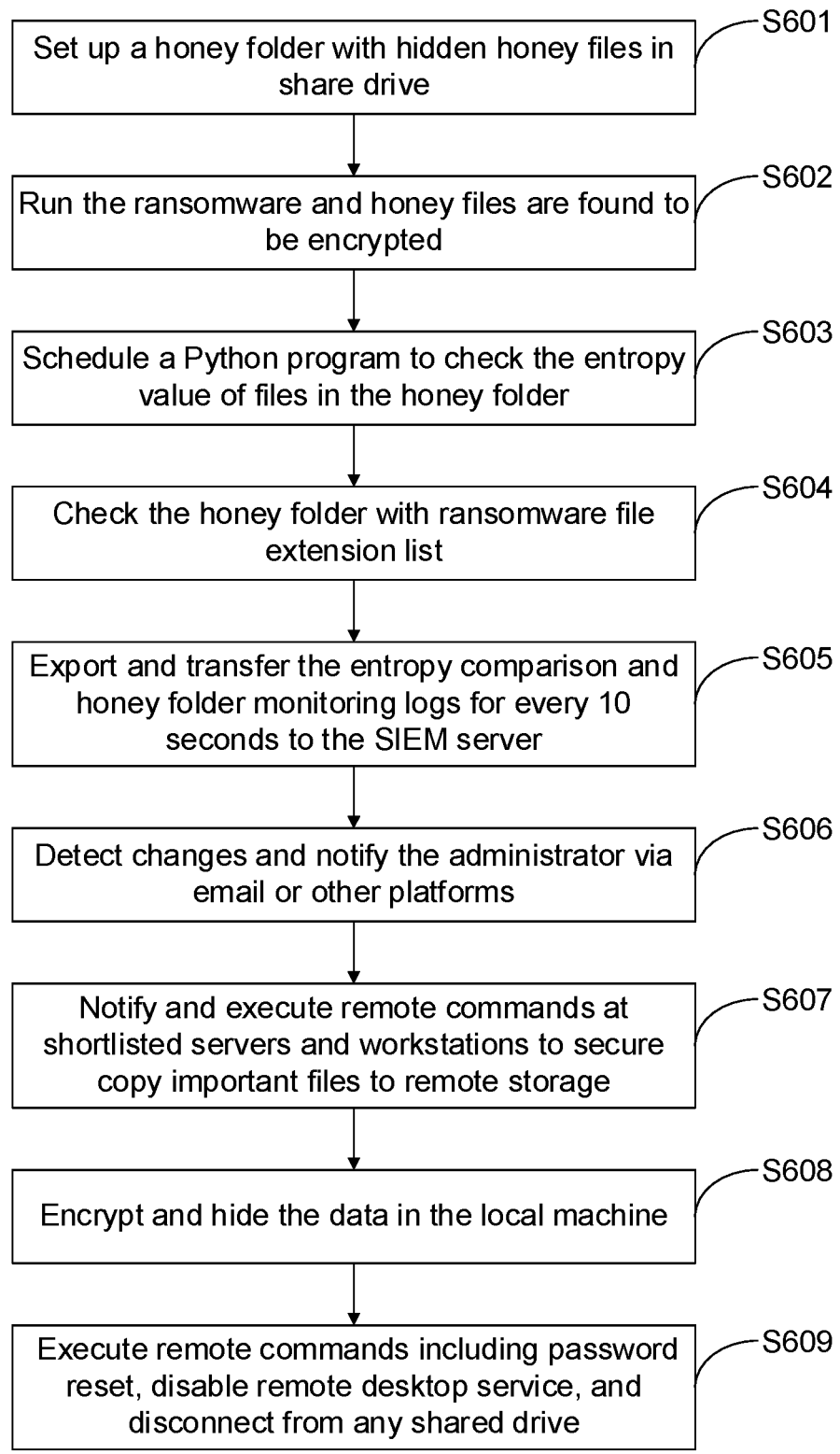
FIG. 6 illustrates a flowchart of the step for the prototype of ransomware security operations center according to the embodiment of the application.

The prototype of ransomware security operations center is built under Windows environment (without honeypot deployment). As shown in the FIG. 6, the steps of the ransomware security operations center are described as follows:

S601: set up a honey folder with hidden honey files in share drive.

S602: run the ransomware and honey files are found to be encrypted.

S603: schedule a Python program to check the entropy value of files in the honey folder.

S604: check the honey folder with ransomware file extension list (refer to CryptoBlocker, https://github.com/nexxai/CryptoBlocker last accessed 2022/03/15).

Figure 7:
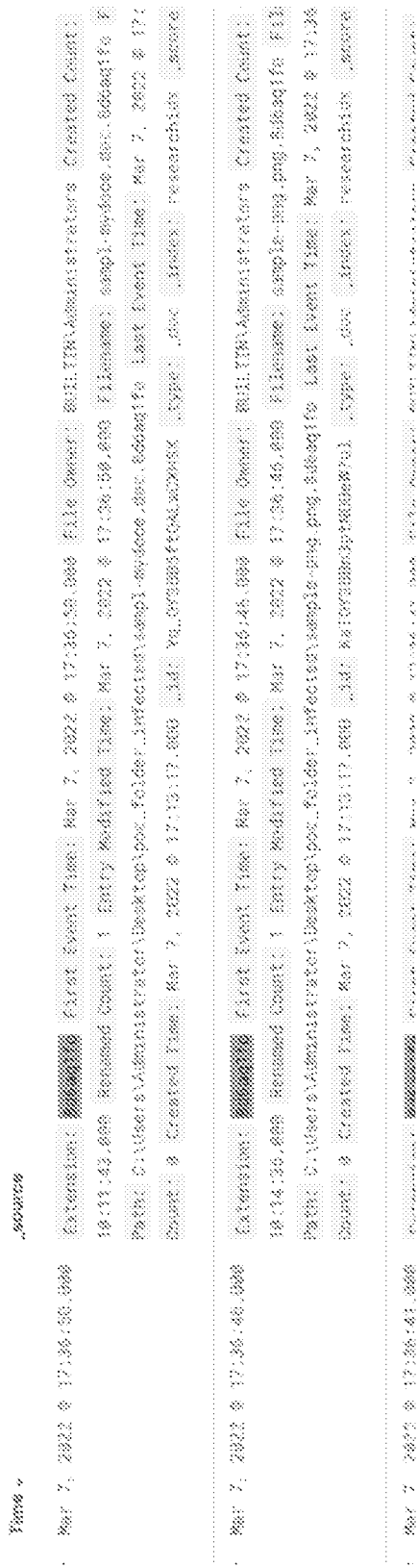
FIG. 7 illustrates a schematic diagram of encrypted data files and honey files identified in STEM in ransomware security operations center.

S605: export and transfer the entropy comparison and honey folder monitoring logs for every 10 seconds to the SIEM server (shown in the FIG. 7).

Figures 8, 9:
FIG. 8 illustrates a schematic diagram of ransomware alert to administrator.
FIG. 9 illustrates a schematic diagram of data files are encrypted, split, and hidden in file types that are not targeted by the ransomware.

S606: detect changes and notify the administrator via email or other platforms (shown in the FIG. 8).

S607: notify and execute remote commands at shortlisted servers and workstations to secure copy important files to remote storage.

S608: encrypt and hide the data in the local machine (shown in the FIG. 9).

S609: execute remote commands including password reset, disable remote desktop service, and disconnect from any shared drive.

The output of the prototype shows that the ransomware attack could be detected, and the administrator will be notified. Also, important data will be backed up locally with the data local backup operation described above.

Embodiment 2: Evaluation of Backup Recover

To evaluate the performance of data recovery by ransomware security operations center, the ransomware from the four ransomware families described above is executed in the servers that are set up in Windows 10 Professional Edition, with 256GB hard disk and 4 GB RAM in virtualized machines. Another ransomware family called Jigsaw is also included in this experiment as it is evaluated in a related study (refer to Paik, J. Y., Kim, G., Kang, S., Jin, R., Cho, E. S.: Data Protection Based on Hidden Space in Windows Against Ransomware. In: Proceedings of Sixth International Congress on Information and Communication Technology, pp. 629-637. Springer, Singapore, 2022).

A target folder with 200 MB, 500 MB, and 1 GB of files is set up in a testbed with three target servers, each server is accompanied by two honeypots in the same network. These three servers have shared drives accessible with each other and remote desktop service is enabled.

For each attack scenario, the attacker is simulated to execute the ransomware at a randomly selected compromised honeypot or server, which will initiate alert and response by ransomware security operations center. Each scenario will be executed 10 times for each ransomware and size of files.

After the ransomware is executed, the ransom note will be shown in 6 to 7 seconds on average, except REvil, which will show the ransom note in 22 seconds. Table 4 exhibits the aggregated data backup rate and data restoration rate of the backed-up data. Since some data may be corrupted during the backup, the data restoration rate is less than 100%. The result shows that a high percentage of data can be hidden locally while the remote backup is inferior due to network delays (96 Mbps upload speed).

However, when the size of data backup increases, the back-up and restoration rates drop slightly as some files in the server are encrypted by ransomware too soon. Among all scenario, the case with worst performance for local data hiding is infecting DarkSide on 1 GB files, which still has 86.88% (91.35%*95.11%) recovery rate. Yet, the best case for remote backup is infecting REvil on 200 MB files, and this case has only 74.09% (78.22%*94.72%) recovery rate.

TABLE 4

| | 200 MB | | 500 MB | | 1 GB | |
|---|---|---|---|---|---|---|
| | Backup Rate | Restoration Rate | Backup Rate | Restoration Rate | Backup Rate | Restoration Rate |
| Local data hiding | | | | | | |
| BlackMatter | 93.05% | 97.07% | 92.25% | 97.07% | 91.15% | 95.44% |
| Conti | 94.76% | 97.68% | 93.34% | 97.68% | 92.42% | 96.62% |
| DarkSide | 93.35% | 96.89% | 92.53% | 96.89% | 91.35% | 95.11% |
| Jigsaw | 95.78% | 97.52% | 93.48% | 97.52% | 95.78% | 96.17% |
| REvil | 98.98% | 99.70% | 97.58% | 99.10% | 98.98% | 98.40% |
| Remote backup | | | | | | |
| BlackMatter | 53.31% | 79.01% | 47.88% | 71.03% | 40.97% | 66.94% |
| Conti | 58.45% | 86.19% | 53.31% | 79.95% | 45.79% | 70.61% |
| DarkSide | 53.89% | 78.76% | 48.16% | 72.29% | 41.16% | 65.28% |
| Jigsaw | 57.71% | 85.29% | 52.34% | 79.33% | 43.11% | 71.64% |
| REvil | 78.22% | 94.72% | 74.12% | 86.31% | 65.02% | 80.66% |

In conclusion, ransomware security operations center according to the application aims to address ransomware attack and notify administrators, typical SOC operators, and critical servers to take further actions if there are any files of the honeypot machine that are encrypted or/and the file extension is changed which is listed in ransomware file extension list. This is done by deploying honeypots, particularly honey folders and files, as guards or frontline solider to detect any malicious encryption and detecting the file extension change which matches the ransomware file extension list, alerting another critical server to back up the data.

The ransomware security operations center should not be integrated into a typical SOC as a whole. On one hand, the typical SOC can alert known attack vectors in the early stage of ransomware attack, including network probing, abnormal number of the login failure, and exploits.

However, most of the attack vectors exploit unpatched vulnerabilities of the systems and compromised the administrator credentials already. In such a case, all related administrative activities look legitimate and normal. Hence, a typical SOC alert cannot show the indicators immediately, and the ransomware security operations center is needed to monitor the data specifically and notify administrators and other systems for defense as early as possible. On the other hand, two groups of SOC operators on separation of duties basis may focus on network and system events and ransomware attack, which can respond and address the attack promptly.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for ransomware defending, comprising:
creating a bait for attracting ransomware;
collecting logs of the bait;
recognizing an information entropy of the bait, according to the logs of the bait;
activating a backup operation, in response to the change of the information entropy reached the preset change threshold;
hiding a target data to a plurality of file protectors that are not encrypted by the ransomware;
wherein the whole target data is separated into several parts and hid to different file protectors; and the file protector is a file type that is not targeted by the ransomware under a file folder that is not targeted by the ransomware.

2. The method according to claim 1, wherein the backup operation comprise:
encrypting the target data;
equally splitting the target data into n partitions;
appending n splits of the target data to a file header that are not targeted by the ransomware,
saving to targeted folder that are not targeted by the ransomware as backup.

3. The method according to claim 2, wherein the file types and/or folders that are not targeted by the ransomware are recorded in an untargeted-object list which is generated by an analyze result of the ransomware.

4. The method according to claim 3, wherein the method further comprises:
updating the untargeted-object list on a regular basis.

5. The method according to claim 1, wherein the backup operation comprises:
transferring a target file to remote backup repository.

6. The method according to claim 1, wherein the method further comprises:
activating the backup operation on a regular basis.

7. The method according to claim 1, wherein the method further comprises:
activating a defense operation and sending a notice of ransomware strike, in response to the change of the information entropy reached the preset change threshold;

wherein the defense operation comprises: resetting password, disabling remote desktop connection, and unmounting and disconnecting all network drives.

8. The method according to claim 1, wherein the bait comprises honeypot host and honey folders and files deployed in system.

9. A ransomware security operations center (SOC), comprises:
   a logs collector configured to collect logs of the bait;
   a logs analyzer configured to analyze file edition activities of the logs;
   a comparison configured to monitor whether change of the information entropy is reached the preset change threshold and check whether a blacklisted ransomware file extension appear;
   a data backup orchestra center configured to activate a backup operation, in response to the change of the information entropy reached the preset change threshold;
   wherein the backup operation comprises:
   hiding a target data to a plurality of file protectors that are not encrypted by the ransomware;
   wherein the whole target data is separated into several parts and hid to different file protectors; and the file protector is a file type that is not targeted by the ransomware under a file folder that is not targeted by the ransomware.

10. The ransomware security operations center according to claim 9, wherein the ransomware security operations center further comprise:
   a ransomware sandbox;
   a file protector definition generator configured to generate a untargeted-object list recording a plurality of file types and folders that are not encrypted by the ransomware.

11. The ransomware security operations center according to claim 10, wherein the data backup orchestra center is configured to hide a target file to a plurality of file types that are not targeted by the ransomware under different file folders that are not targeted by the ransomware, when the backup operation is activated.

12. The ransomware security operations center according to claim 9, wherein the data backup orchestra center is configured to transfer a target file to remote backup repository when the backup operation is activated.

13. The ransomware security operations center according to claim 9, wherein the ransomware security operations center further comprise:
   a defense command orchestra center configured to activate a defense operation, in response to the change of the information entropy reached the preset change threshold;
   a notification center configured to send a notice of ransomware strike, in response to the change of the information entropy reached the preset change threshold.

14. The ransomware security operations center according to claim 9, wherein the bait comprises honeypot host and honey folders and files deployed in system.

15. The ransomware security operations center according to claim 9, wherein the data backup orchestra center is configured to activate a backup operation on a regular basis.

16. An electronic device, comprises:
   a memory storing computer programs;
   a processor coupled to the memory; wherein execution of the computer programs by the processor, causes the processor to:
   creating a bait for attracting ransomware;
   collecting logs of the bait;
   recognizing an information entropy of the bait, according to the logs of the bait;
   activating a backup operation, in response to the change of the information entropy reached the preset change threshold;
   and activating a restoration;
   wherein the backup operation comprises:
   hiding a target data to a plurality of file protectors that are not encrypted by the ransomware;
   wherein the whole target data is separated into several parts and hid to different file protectors; and the file protector is a file type that is not targeted by the ransomware under a file folder that is not targeted by the ransomware;
   wherein the restoration comprises:
   for every protected target data:
   removing the file header from a protected file split
   combining n splits of file
   decrypting and outputting a restored file.

17. The electronic device according to claim 16, wherein the backup operation comprises:
   hiding a target data to a plurality of file protectors that are not encrypted by the ransomware.

18. The electronic device according to claim 17, wherein the file protector is file types and/or folders that are not targeted by the ransomware, and the file types and folders are recorded in a untargeted-object list which is generated by an analyze result of the ransomware.

\* \* \* \* \*